(12) United States Patent
Tsuji et al.

(10) Patent No.: US 12,140,740 B2
(45) Date of Patent: Nov. 12, 2024

(54) OPTICAL DEVICE FOR INTRODUCING LIGHT FROM OUTDOOR VIEW

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Masatoshi Tsuji, Nisshin (JP); Kodai Takeda, Nisshin (JP); Hiroshi Ando, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 260 days.

(21) Appl. No.: 17/835,029

(22) Filed: Jun. 8, 2022

(65) Prior Publication Data

US 2022/0404598 A1 Dec. 22, 2022

(30) Foreign Application Priority Data

Jun. 21, 2021 (JP) ................................. 2021-102600

(51) Int. Cl.
*G02B 17/02* (2006.01)
*B60R 1/00* (2022.01)
(Continued)

(52) U.S. Cl.
CPC ............ *G02B 17/026* (2013.01); *B60R 1/007* (2013.01); *G02B 17/006* (2013.01);
(Continued)

(58) Field of Classification Search
CPC ........... B60R 1/007; B60R 1/081; B60R 1/10; G02B 17/006; G02B 17/008; G02B 17/026; G02B 2207/123
See application file for complete search history.

(56) References Cited

U.S. PATENT DOCUMENTS 10,046,705 B2 * 8/2018 Haruyama ......... G02B 27/1066
2015/0234100 A1 * 8/2015 Lu ...................... G02B 27/0938
359/850
(Continued)

FOREIGN PATENT DOCUMENTS

JP 2006-231998 A 9/2006
JP 2007-279424 A 10/2007
(Continued)

OTHER PUBLICATIONS

English machine translation of JP-2015024798-A (Year: 2015).*

*Primary Examiner* — Nicholas R. Pasko
(74) *Attorney, Agent, or Firm* — Posz Law Group, PLC

(57) ABSTRACT

An optical device introduces light from an outdoor view in a blind spot area hidden by an obstacle. The optical device includes a first reflector that reflects a part of light and transmits another part of the light, and a second reflector placed between a back surface of the first reflector and the obstacle and apart from the first reflector. The second reflector has a reflective surface that reflects light incident from the first reflector toward the first reflector. A light shield is placed at a front surface of the first reflector to block external light incident on and reflected from the front surface of the first reflector. The light shield includes light-shielding plates arranged at an interval in a vertical direction such that each light-shielding plate is horizontal. The first reflector is parallel to the reflective surface of the second reflector and tilted from a vertical axis.

5 Claims, 7 Drawing Sheets

(51) Int. Cl.
*G02B 17/00* (2006.01)
*B60R 11/00* (2006.01)
(52) U.S. Cl.
CPC .... *G02B 17/008* (2013.01); *B60R 2011/0022* (2013.01); *G02B 2207/123* (2013.01)

(56) References Cited

U.S. PATENT DOCUMENTS

2019/0210527 A1* 7/2019 Ji ........................... B62D 25/04
2019/0322218 A1* 10/2019 Lee ..................... G02B 17/008

FOREIGN PATENT DOCUMENTS

| JP | 2015024798 | A | * | 2/2015 | | |
| JP | 2015143087 | A | * | 8/2015 | | |
| JP | 2016002975 | A | * | 1/2016 | | |
| JP | 6172512 | B2 | | 8/2017 | | |
| WO | WO-2017221914 | A1 | * | 12/2017 | ............... | B60R 1/10 |

* cited by examiner

FIG. 1
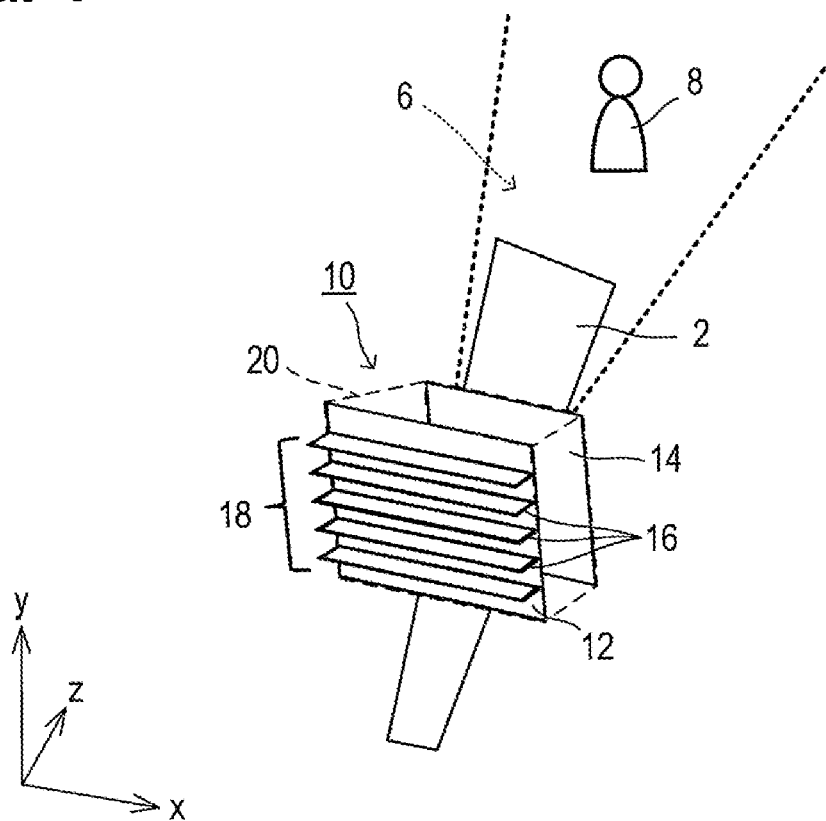
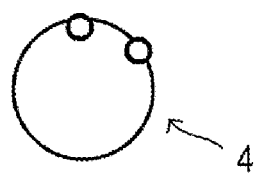

FIG. 6  COMPARATIVE EXAMPLE

OPTICAL DEVICE FOR INTRODUCING LIGHT FROM OUTDOOR VIEW

CROSS REFERENCE TO RELATED APPLICATION

This application is based on and incorporates herein by reference Japanese Patent Application No. 2021-102600 filed on Jun. 21, 2021.

TECHNICAL FIELD

The present disclosure relates to an optical device for introducing light coming from an outdoor view.

BACKGROUND

An optical device includes a semi-transparent mirror that reflects a part of light and transmits a part of light, and a reflection mirror that reflects light. The semi-transparent mirror and the reflection mirror are arranged to face each other. The semi-transparent mirror is located between a viewer and the reflection mirror such that a part of light coming from a blind spot area hidden by an obstacle is reflected from the semi-transparent mirror to the reflection mirror. The light coming from the blind spot area is reflected between the semi-transparent mirror and the reflection mirror. Since a part of the light is transmitted through the semi-transparent mirror toward the viewer, the outdoor view of the blind spot area becomes visible to the viewer.

SUMMARY

According to at least one embodiment of the present disclosure, an optical device introduces light from an outdoor view in a blind spot area hidden by an obstacle. The optical device includes a first reflector, a second reflector and a light shield. The first reflector reflects a part of light and transmits another part of the light. The first reflector has a front surface and a back surface on opposite sides of the first reflector. The second reflector is placed between the back surface of the first reflector and the obstacle and apart from the back surface of the first reflector by a predetermined distance. The second reflector has a reflective surface that reflects light incident from the first reflector toward the first reflector such that light coming from the outdoor view of the blind spot area to the first reflector is reflected by the back surface of the first reflector and then reflected by the reflective surface of the second reflector toward the first reflector. The light shield is placed such that the first reflector is between the second reflector and the light shield. The light shield blocks external light incident on and reflected by the front surface of the first reflector. The light shield includes light-shielding plates arranged at an interval in a vertical direction such that each of the light-shielding plates is horizontal in a view from a viewer who faces the front surface of the first reflector. The first reflector has a plate shape parallel to the reflective surface of the second reflector and tilted at a predetermined tilt angle from a vertical axis that is vertical in the view from the viewer.

BRIEF DESCRIPTION OF DRAWING

The details of one or more embodiments are set forth in the accompanying drawings and the description below. Other features and advantages will be apparent from the description and drawings, and from the claims.

FIG. 1 is a schematic diagram showing a configuration of an optical device according to a first embodiment.

DETAILED DESCRIPTION

Figure 2:
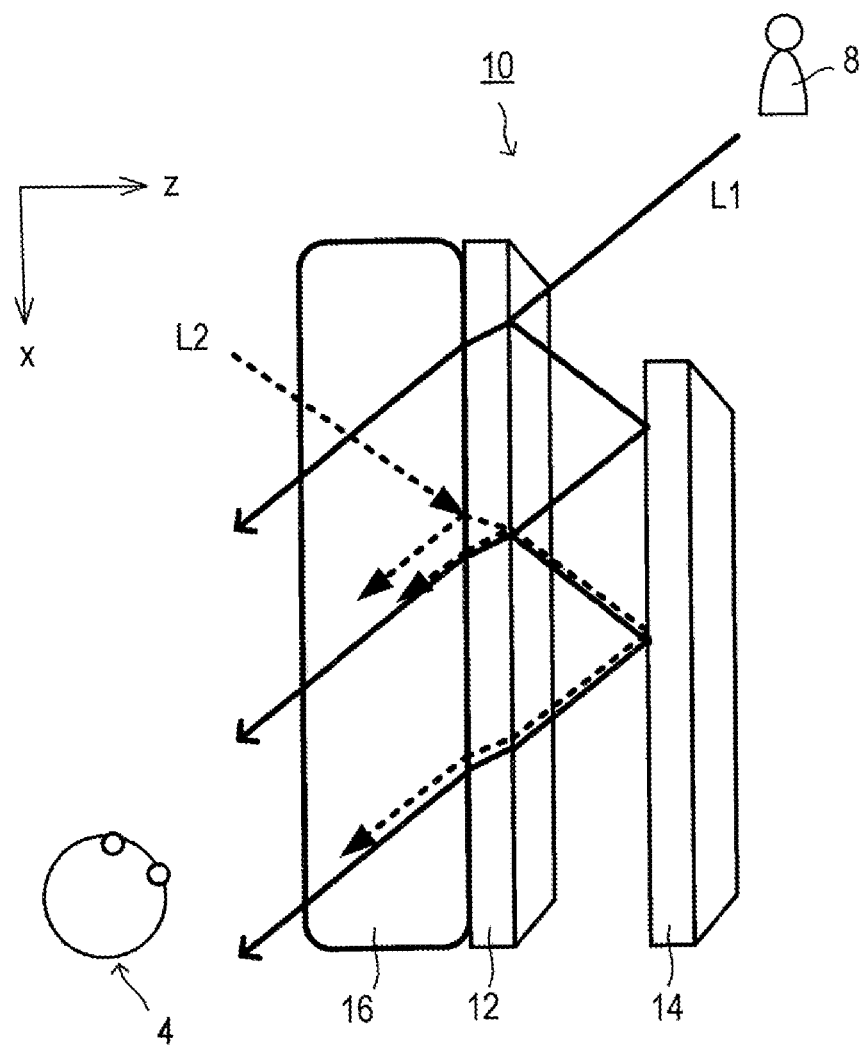
FIG. 2 is a top view of the optical device shown in FIG. 1.

To begin with, examples of relevant techniques will be described. An optical device according to a comparative example introduces light coming from an outdoor view. The optical device visualizes the outdoor view of a blind spot area hidden by an obstacle.

The optical device includes a semi-transparent mirror that reflects a part of light and transmits a part of light, and a reflection mirror that reflects light. The semi-transparent mirror and the reflection mirror are arranged to face each other. The semi-transparent mirror is located between a viewer and the reflection mirror such that a part of the light from the blind spot area blocked by the obstacle is reflected from the semi-transparent mirror to the reflection mirror. Therefore, the light from the blind spot area is reflected between the semi-transparent mirror and the reflection mirror. Since a part of the light is transmitted through the semi-transparent mirror toward the viewer, the outdoor view of the blind spot area becomes visible to the viewer.

Further, in this device of the comparative example, when external light is incident on a surface of the semi-transparent mirror facing the viewer and the external light is reflected toward the viewer, the viewer has difficulty to visually recognize the outdoor view of the blind spot area. Therefore, the optical device includes a light shield on an opposite side of the semi-transparent mirror from the reflection mirror, and the light shield blocks a reflection path of the external light such that the external light incident from the viewer is not reflected toward the viewer.

However, as a result of detailed studies by the inventors, it is found in the optical device that the light shield provides a difference in views from left and right eyes of the viewer, and the difference deteriorates visibility of the outdoor view in the blind spot area.

The light shield includes multiple light-shielding plates arranged so that each plate surface extends in the vertical direction when viewed from the viewer. The light-shielding plates are parallel and arranged at intervals to block the above-mentioned reflection path of the external light. Therefore, the left and right eyes of the viewer perceive different shapes and positions of the light shield due to binocular disparity. As a result, in binocular vision of the viewer, the light-shielding plates perceived by the left and right eyes are superimposed so as to conceal the outdoor view, and the visibility of the outdoor view may be deteriorated.

In contrast, according to the present disclosure, such deterioration in visibility of an outdoor view due to presence of a light shield can be reduced.

According to an aspect of the present disclosure, an optical device introduces light from an outdoor view in a blind spot area hidden by an obstacle. The optical device includes a first reflector, a second reflector and a light shield. The first reflector reflects a part of light and transmits another part of the light. The first reflector has a front surface and a back surface on opposite sides of the first reflector. The second reflector is placed between the back surface of the first reflector and the obstacle and apart from the back surface of the first reflector by a predetermined distance. The second reflector has a reflective surface that reflects light incident from the first reflector toward the first reflector such that light transmitted from the outdoor view of the blind spot area to the first reflector is reflected by the back surface of the first reflector and then reflected by the reflective surface of the second reflector. The light shield is placed such that the first reflector is between the second reflector and the light shield. The light shield blocks external light incident on and reflected by the front surface of the first reflector. The light shield includes light-shielding plates arranged at an interval in a vertical direction such that each of the light-shielding plates is horizontal in a view from a viewer facing the front surface of the first reflector. The first reflector has a plate shape parallel to the reflective surface of the second reflector and tilted at a predetermined tilt angle from a vertical axis that is vertical in the view from the viewer.

The optical device may be placed such that the second reflector is located between the first reflector and the obstacle that hinders the viewer from seeing the outdoor view and light coming from the outdoor view of the blind spot area hidden by the obstacle enters the first reflector.

According to this arrangement, the light from the blind spot area is reflected between the first reflector and the second reflector. A part of the light is transmitted through the first reflector to the viewer. The viewer can visually recognize the outdoor view of the blind spot area by the light transmitted through the first reflector.

On the other hand, the front surface of the first reflector facing away from the second reflector is provided with the light-shielding plates of the light shield. The light-shielding plates are arranged at the interval in the vertical direction such that each of the light-shielding plates is horizontal. Therefore, external light is incident on the front surface of the first reflector through the interval between the light-shielding plates.

A part of the external light incident on the front surface of the first reflector is reflected on the front surface of the first reflector, and another part of the light enters the first reflector. Further, a part of the external light inside the first reflector is reflected by the back surface of the first reflector facing the second reflector and then transmitted outward from the front surface of the first reflector.

Further, another part of the external light inside the first reflector is transmitted outward from the back surface of the first reflector toward the second reflector and then is reflected by the reflective surface of the second reflector. Then, the external light reflected by the reflective surface of the second reflector enters the first reflector through the back surface of the first reflector, and is transmitted outward from the front surface of the first reflector.

Accordingly, the external light incident on the front surface of the first reflector through the interval between the light-shielding plates is reflected by the front and back surfaces of the first reflector and the reflective surface of the second reflector. This reflected external light is transmitted outward from the front surface of the first reflector.

On the other hand, since the first reflector and the second reflector are tilted from the vertical axis at the predetermined tilt angle, the reflected external light is transmitted outward of the first reflector in a direction different from a direction of incidence of the external light, i.e. toward the light-shielding plates of the light shield. Therefore, the reflected external light is blocked by the light-shielding plates.

Therefore, according to the optical device of the present disclosure, deterioration in visibility of the outdoor view from the viewer due to the reflection of the external light incident from the interval between the light-shielding plates can be reduced.

Further, since the light-shielding plates of the light shield are horizontal, difference in shape and position of the light-shielding plates between views of right and left eyes of the viewer due to binocular disparity of the viewer can be reduced.

Therefore, according to the optical device of the present disclosure, deterioration in visibility of the outdoor view due to the presence of the light-shielding plates of the light shield can be reduced.

In the following, an embodiment of the present disclosure will be described with reference to the drawings.

First Embodiment

As shown in FIG. 1, an optical device 10 for introducing light coming from an outdoor view, according to a first embodiment, is attached to an obstacle 2 that hinders a viewer 4 from visually recognizing surroundings. The optical device 10 allows the viewer 4 to visually recognize an outdoor view 8 of a blind spot area 6 which is an area that cannot be directly seen by the viewer 4. The obstacle 2 may be, for example, a front pillar of an automobile on a drivers side, which hinders a driver from visually recognizing surroundings of the vehicle.

The external-light introducing optical device 10 includes a transparent reflective portion 12, a reflective portion 14, and a light shield 18. The transparent reflective portion corresponds to a first reflector, and the reflective portion 14 corresponds to a second reflector.

The transparent reflective portion 12 includes a plate-shaped semi-transparent mirror that reflects a part of light and transmits another part of the light. The reflective portion 14 includes a plate-shaped reflective mirror. The reflective portion 14 has a reflective surface (plate surface) 14A that faces one of opposite plate surfaces of the transparent reflective portion 12. The reflective portion 14 is parallel to and apart from the transparent reflective portion 12 by a predetermined distance.

Since the transparent reflective portion 12 and the reflective portion 14 can be configured in the same manner as a semi-transparent flat mirror and a flat mirror described in JP 6172512 B2, detailed descriptions of them will be omitted here. The disclosure of JP 6172512 B2 is incorporated herein by reference. In the following descriptions, in a view from the viewer 4, a horizontal direction is referred to as an x-axis direction, a vertical direction is referred to as a y-axis direction, and a front-rear direction is referred to as a z-axis direction.

The transparent reflective portion 12 and the reflective portion 14 both have a rectangular plate shape. The transparent reflective portion 12 and the reflective portion 14 are positioned so as to face each other via a holder 20 that holds their outer circumferences. Further, the transparent reflective portion 12 and the reflective portion 14 are fixed to the obstacle 2 via the holder 20. A surface of the reflective portion 14 facing away from the transparent reflective portion 12 faces the obstacle 2. A front surface (plate surface) 12A of the transparent reflective portion 12 facing away from the reflective portion 14 faces the viewer 4.

The transparent reflective portion 12 is longer in length in the x-axis direction than the reflective portion 14. This allows light L1 coming from the outdoor view 8 of the blind spot area 6, as shown in FIG. 2, to be incident on and reflected from a back surface (plate surface) 12B of the transparent reflective portion 12 that faces the reflective portion 14. Accordingly, the light L1 propagates while being reflected between the back surface 12B of the transparent reflective portion 12 and the reflective surface 14A of the reflective portion 14.

Then, every time the light L1 coming from the outdoor view 8 of the blind spot area 6 is incident on the transparent reflective portion 12 during the propagation of the light L1, a part of the light L1 is transmitted through the transparent reflective portion 12. As a result, the viewer 4 can visually recognize the outdoor view 8 by perceiving the light L1 transmitted through the transparent reflective portion 12.

Figure 3:
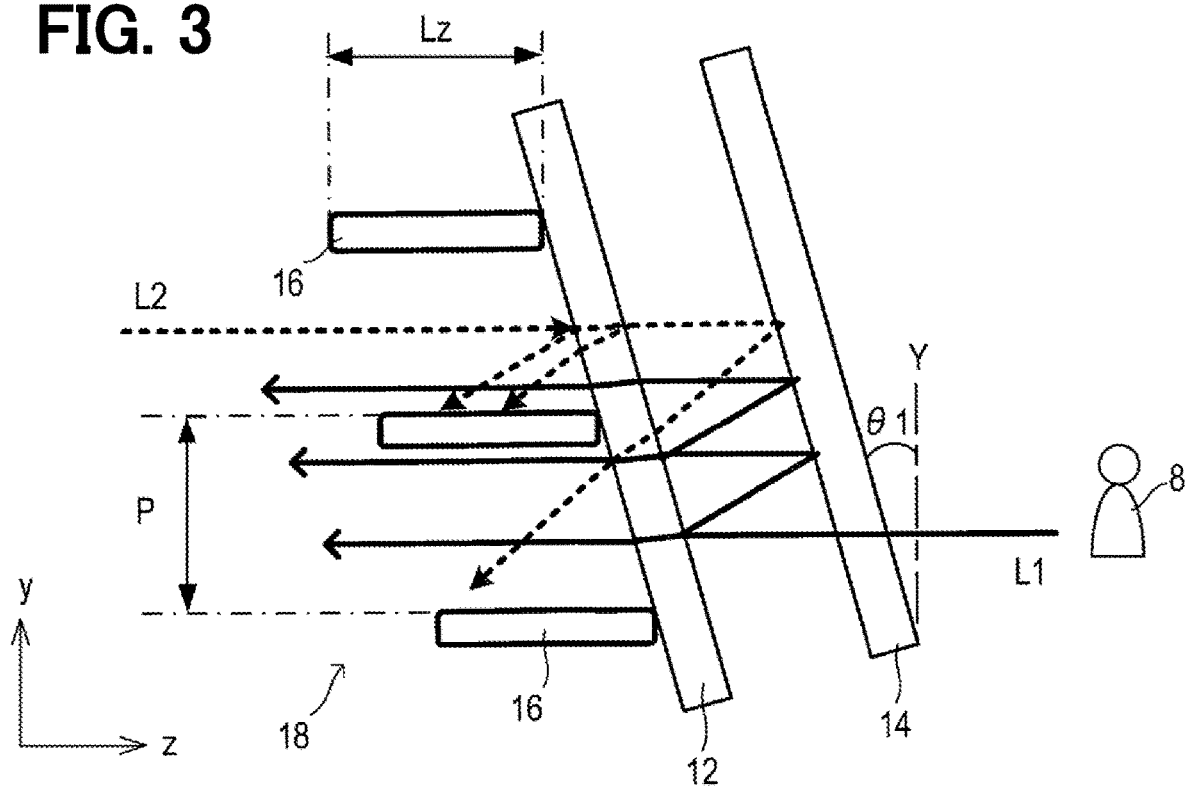
FIG. 3 is a right side view of the optical device shown in FIG. 1.

Next, as shown in FIG. 3, the light shield 18 prevents external light L2 incident from the front surface 12A from being transmitted toward the viewer 4 when the external light L2 is reflected by the transparent reflective portion 12 or the reflective portion 14.

The light shield 18 includes light-shielding plates 16 made of an absorbent material that absorbs light. The light-shielding plates 16 are arranged on the front surface 12A of the transparent reflective portion 12 at a interval in the y-axis direction so that plate surfaces of the light-shielding plates 16 are horizontal in the view from the viewer 4.

Each light-shielding plate 16 may be entirely made of the absorbent material, or alternatively, may be covered with a paint that absorbs light. The absorbent material may be, for example, carbon fine particles, carbon fiber, aluminum oxide (alumite), nickel, or chromium.

The light shield 18 may be provided on the front surface 12A of the transparent reflective portion 12 via the holder 20, or alternatively, each light-shielding plate 16 may be fixed to the front surface 12A of the transparent reflective portion 12 by an adhesive or the like.

The plate surfaces of the transparent reflective portion 12 and the reflective portion 14 are tilted at a predetermined tilt angle $\theta 1$ from a vertical axis that is vertical in the view from the viewer 4. The tilt angle $\theta 1$ is set so that the external light L2 incident on the transparent reflective portion 12 is reflected toward the light-shielding plates 16.

In FIG. 3, the tilt angle $\theta 1$ is set so that the transparent reflective portion 12 and the reflective portion 14 are forward tilted relative to an incident direction of the external light L2. However, even when the tilt angle $\theta 1$ is set so that the transparent reflective portion 12 and the reflective portion 14 are tilted backward relative to the incident direction of the external light L2, the external light L2 can be reflected toward the light-shielding plates 16.

In FIG. 3, the number of light-shielding plates 16 constituting the light shield 18 is three, which is different from that in FIG. 1. However, this number is only for explanation about the arrangement of the light-shielding plates 16 and the relationship between each light-shielding plate 16 and a light path of the external light L2.

That is, since the light-shielding plates 16 are arranged at a predetermined interval P on the front surface 12A of the transparent reflective portion 12, the number of the light-shielding plates 16 may be determined based on the interval P of the light-shielding plates 16 and a length of the transparent reflective portion 12 in the y-axis direction such that the light-shielding plates 16 can be placed on the transparent reflective portion 12.

Further, the interval P of the light-shielding plates 16 is determined together with a protruding length Lz of the light-shielding plates 16 protruding from the transparent reflective portion 12 such that the light reflected from the back surface 12B of the transparent reflective portion 12 can be absorbed by the light-shielding plates 16.

Figure 4:
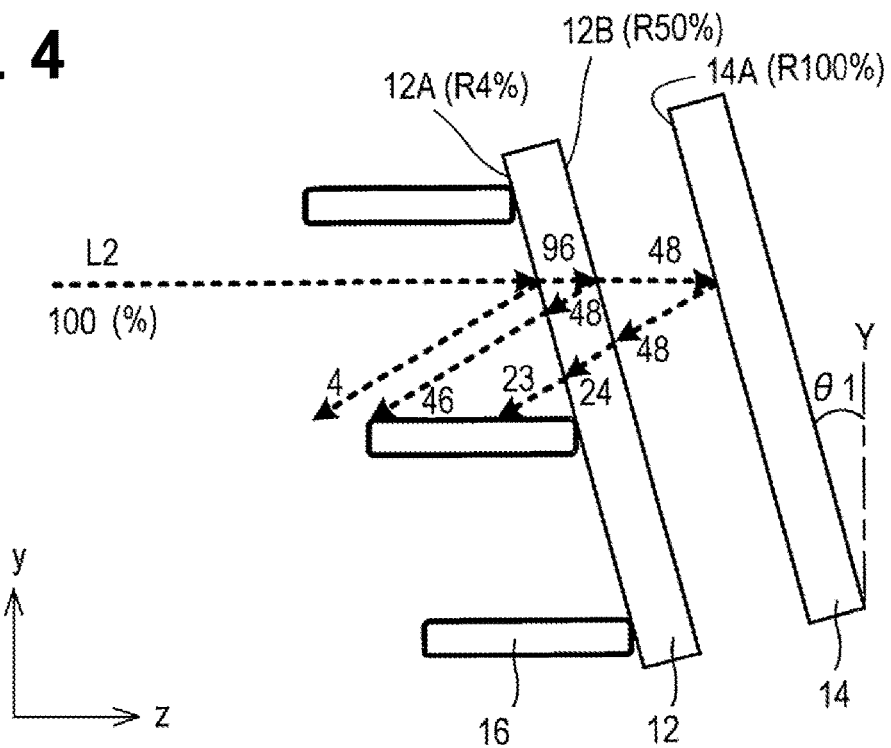
FIG. 4 is an explanatory diagram illustrating a relationship between arrangement of light-shielding plates and a reflection path of external light.

That is, as shown in FIG. 4, the external light L2 is sequentially reflected by the front surface 12A and the back surface 12B of the transparent reflective portion 12 and the reflective surface 14A of the reflective portion 14. Then, the external light L2 is transmitted from the front surface 12A of the transparent reflective portion 12.

In the transparent reflective portion 12, a reflectance R of the front surface 12A for the external light L2 is, for example, 4%, and a reflectance R of the back surface 12B for the external light L2 is, for example, 50%. In the reflective portion 14, a reflectance R of the reflective surface 14A for the external light L2 is, for example, 100%.

Therefore, when an amount of light of the external light L2 is defined as 100%, a first amount of the external light L2 reflected by the front surface 12A of the transparent reflective portion 12 is, for example, 4%. A second amount of the external light L2 reflected by the back surface 12B of the transparent reflective portion 12 and transmitted outward from the front surface 12A of the transparent reflective portion 12 is, for example, 46%. A third amount of the external light L2 reflected by the reflective surface 14A of the reflective portion 14, entering the transparent reflective portion 12 and then transmitted outward from the front surface 12A of the transparent reflective portion 12 is, for example, 23%.

Therefore, the largest among the first to third amounts of the external light L2 is the second amount of the external light L2 that is reflected by the back surface 12B of the transparent reflective portion 12

Therefore, in the present embodiment, the interval P of the light-shielding plates 16 of the light shield 18 and the protruding length Lz of each of the light-shielding plates 16 are set such that at least the external light L2 reflected by the back surface 12B of the transparent reflective portion 12 is blocked.

Therefore, according to the optical device 10 of the present embodiment, the light-shielding plates 16 of the light shield 18 can block the external light L2 incident on the front surface 12A of the transparent reflective portion 12 and reflected by the back surface 12B of the transparent reflective portion 12 or the reflective surface 14A of the reflective portion 14. Therefore, an amount of the external light L2 reflected toward the viewer 4 can be reduced sufficiently. As a result, deterioration in visibility of the outdoor view 8 from the viewer 4 due to the reflected external light can be reduced.

Further, in the optical device 10 of the present embodiment, the light shield 18 includes the light-shielding plates 16, and the plate surface of each light-shielding plate 16 is horizontal when viewed from the viewer 4.

In a comparative example, light-shielding plates 16 are arranged such that a plate surface of each light-shielding plate 16 is parallel to the y-axis direction, i.e. vertical when viewed from a viewer 4. In this example, an outdoor view 8 becomes difficult be seen by the viewer 4 because of binocular disparity of the viewer 4.

Figure 6:
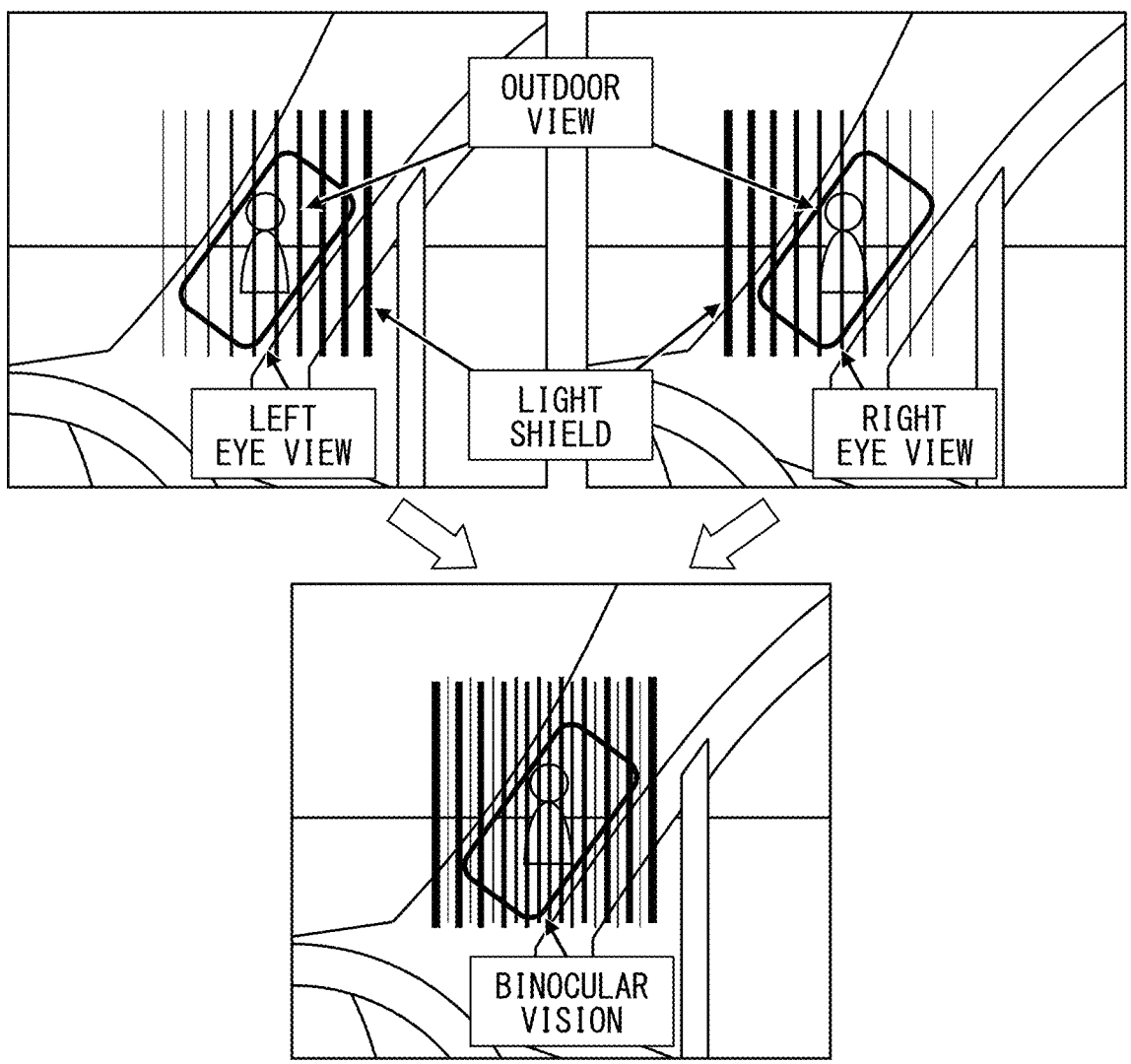
FIG. 6 is an explanatory diagram illustrating an image of an outdoor view visually recognized through an optical device according to a comparative example.

That is, when the plate surfaces of light-shielding plates are parallel to the y-axis direction, as shown in the left eye view and the right eye view in FIG. 6, the binocular disparity of the viewer 4 causes each light-shielding plate to have different shapes and be located at different positions in the views from right and left eyes of the viewer 4. Therefore, in the binocular vision of the viewer 4, the light shields perceived by the left and right eyes are superimposed so as to cover the outdoor view, and the visibility of the outdoor view is deteriorated.

Figure 5:
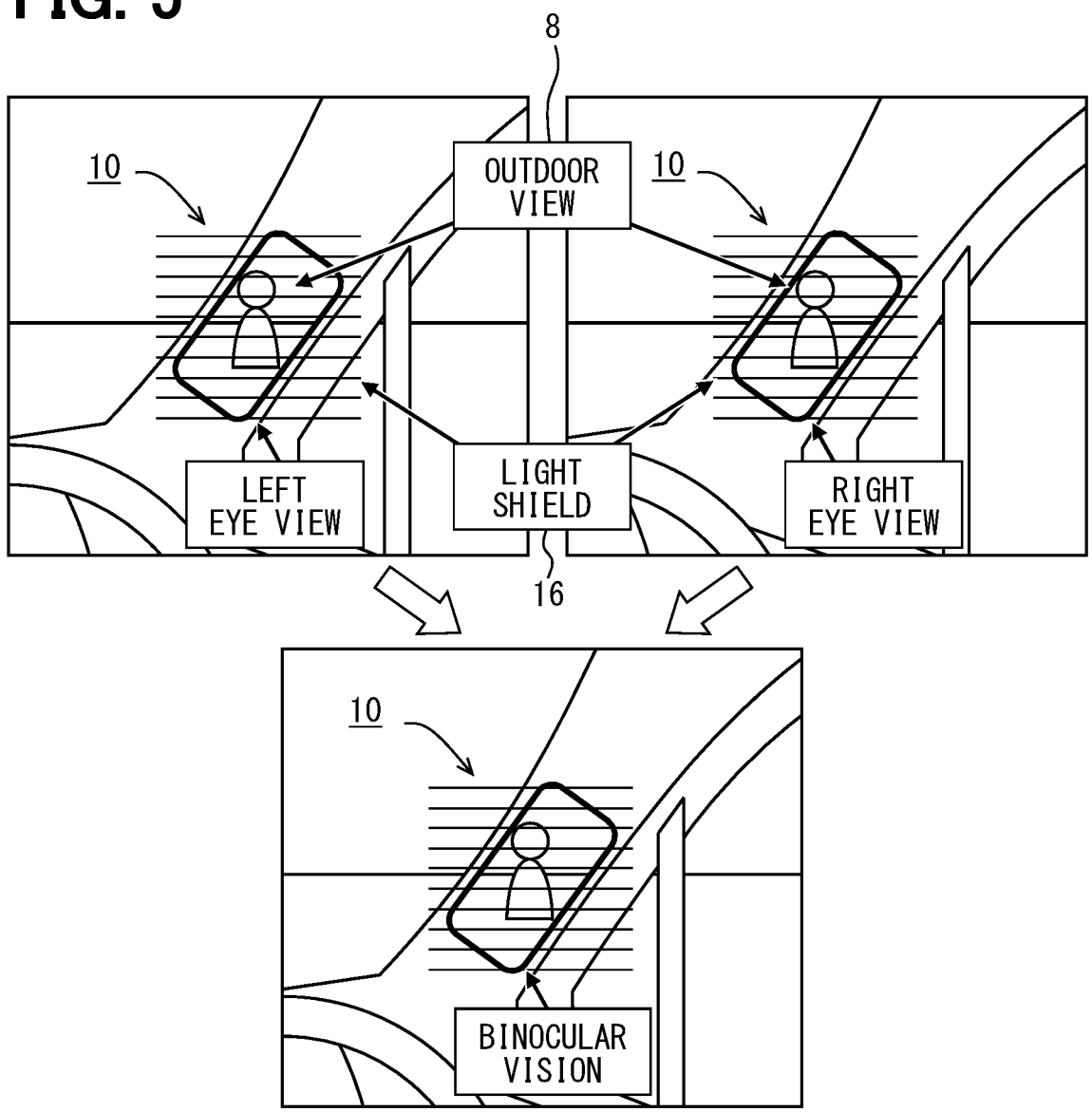
FIG. 5 is an explanatory diagram illustrating an image of an outdoor view visually recognized through the optical device according to the first embodiment.

In contrast, according to the present embodiment, since each of light-shielding plates 16 is horizontal when viewed from the viewer 4, as shown in FIG. 5, each light-shielding plate 16 perceived by the left and right eyes of the viewer 4 has almost the same shape and is located at almost the same position.

Therefore, according to the optical device 10 of the present embodiment, double vision of the light-shielding plates 16 due to the binocular disparity of the viewer 4 can be reduced, and the viewer 4 can clearly see the outdoor view 8. Note that FIGS. 5 and 6 show views when the driver as the viewer 4 sees the optical device 10 attached to the front pillar on the drivers side of the automobile while sitting in the drivers seat.

Second Embodiment

Next, a second embodiment of the present disclosure is described.

Figure 7:
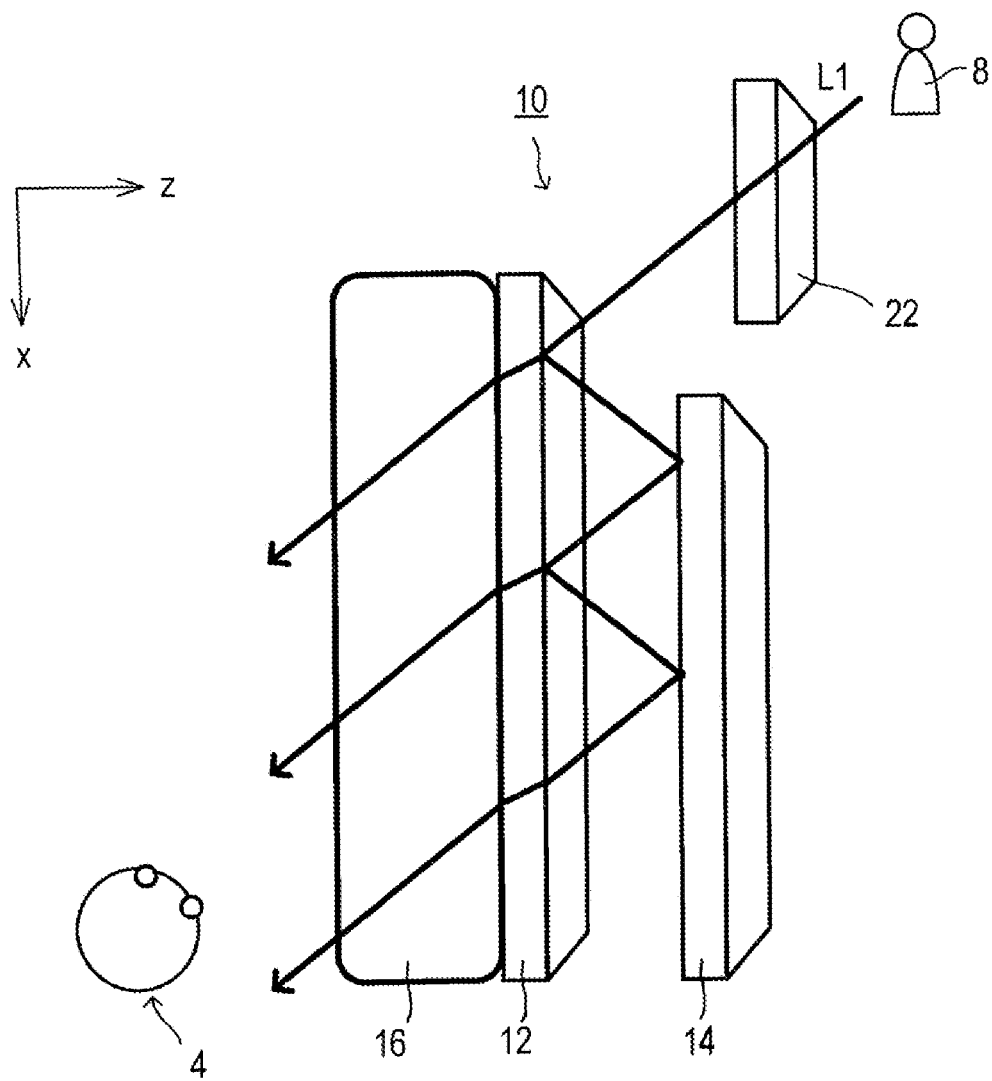
FIG. 7 is a top view of an optical device, according to a second embodiment.
Figure 8A:
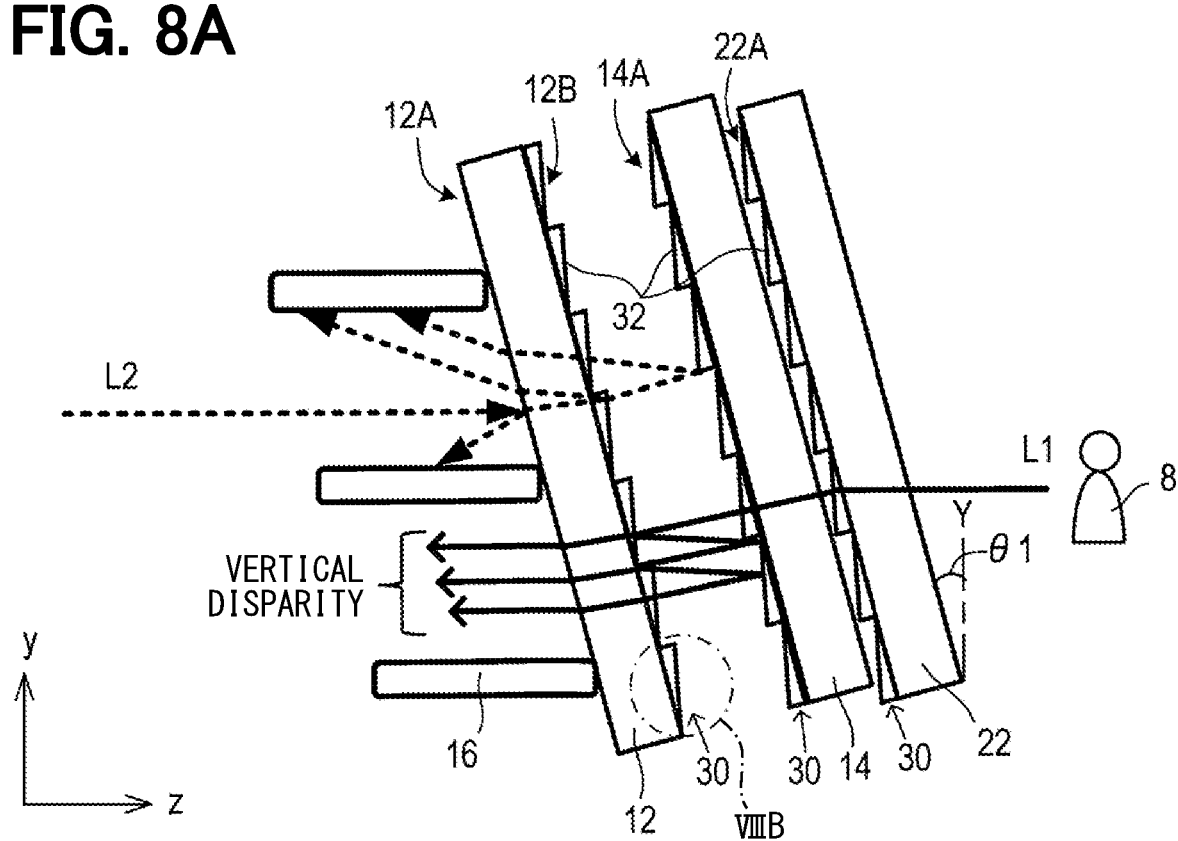
FIG. 8A is a right side view of the optical device according to the second embodiment.
Figure 8B:
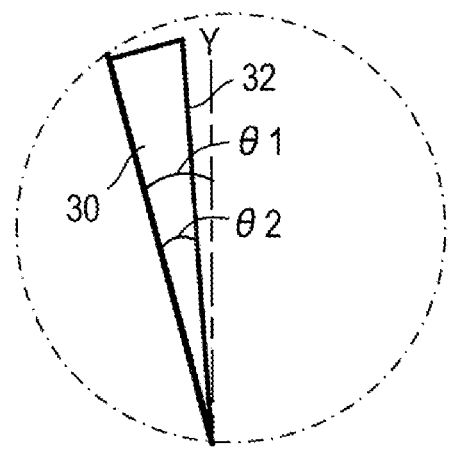
FIG. 8B is an enlarged view of a part VIIIB in FIG. 8A.

An optical device 10 for introducing light from an outdoor view, according to the present embodiment, has the same basic configuration as that of the first embodiment, and is different from the first embodiment in the following points a) to c).
  a) As shown in FIG. 7, a transmission portion 22 that transmits light is provided on an incident path of light that is incident on a transparent reflective portion 12 from an outdoor view 8 in a blind spot area 6. The transmission portion 22 corresponds to a transmitter that transmits light. The transmission portion 22 is made of a material capable of transmitting light, such as transparent glass or synthetic resin.
  b) As shown in FIGS. 8A and 8B, multiple steps 30 are provided on a reflective surface 14A of a reflective portion 14 and a back surface 12B of the transparent reflective portion 12 facing the reflective surface 14A. As a result, the reflective surface 14A and the back surface 12B have a sawtooth shape in cross section along the y-axis direction.
  c) As shown in FIGS. 7, 8A and 8B, the transmission portion 22 has a plate shape, and a plate surface of the transmission portion 22 is tilted relative to the vertical axis y at a tilt angle same as a tilt angle θ1 of the transparent reflective portion 12. Further, a surface 22A of the transmission portion 22 facing the transparent reflective portion 12 has multiple steps 30 so as to have the same sawtooth shape as the reflective surface 14A of the reflective portion 14.

As shown in FIGS. 8A and 8B, the steps 30 of the reflective portion 14 and the steps 30 of the transparent reflective portion 12 have the same shapes but are inverted to each other along the y-axis direction. Slopes 32 of the sawtooth shape of the reflective portion 14 and slopes 32 of the sawtooth shape of the transparent reflective portion 12 facing each other are parallel.

Further, the steps 30 of the transmission portion 22 also have the same shape as those of the reflective portion 14 and the transparent reflective portion 12. Similar to the steps 30 of the reflective portion 14, the steps 30 of the transmission portion 22 are inverted to the steps 30 of the transparent reflective portion 12 along the y-axis direction.

Further, the slope 32 of each step 30 is inclined at a predetermined slope angle θ2 on the reflective surface 14A of the reflective portion 14, the back surface 12B of the transparent reflective portion 12, and the surface 22A of the transmission portion 22. The slope angle θ2 of the slope 32 is smaller than the tilt angle θ1 at which the transparent reflective portion 12, the reflective portion 14, and the transmission portion 22 are tilted relative to the vertical axis y.

In the optical device 10 of the present embodiment described above, external light L2 is reflected downward by the front surface 12A of the transparent reflective portion 12.

On the other hand, the external light L2 passing through the front surface 12A of the transparent reflective portion 12 is divided into a part transmitted toward the reflective portion 14 through the steps 30 of the back surface 12B of the transparent reflective portion 12 and a remaining part reflected by a surface of the steps 30 facing the reflective portion 14.

Further, the external light L2 transmitted from the transparent reflective portion 12 toward the reflective portion 14 is reflected by the reflective surface 14A of the reflective portion 14 and then enters the transparent reflective portion 12 through the steps 30 of the transparent reflective portion 12.

Therefore, the external light L2 reflected by the back surface 12B of the transparent reflective portion 12 and the reflective surface 14A of the reflective portion 14 passes through the steps 30 on the back surface 12B of the transparent reflective portion 12 twice.

The steps 30 of the transparent reflective portion 12 function as a prism that changes an optical path of the external light L2. The external light L2 reflected by the back surface 12B of the transparent reflective portion 12 and the external light L2 reflected by the reflective surface 14A of the reflective portion 14 are transmitted upward from the front surface 12A of the transparent reflective portion 12.

Therefore, since the reflected external light L2 is shielded by the light-shielding plates 16 located above and below, emission of the reflected external light L2 toward the viewer 4 can be reduced, similarly to the first embodiment.

On the other hand, since the light L1 coming from the outdoor view 8 passes through the steps 30 of the transmission portion 22, an angle of transmission of the light L1 from the transmission portion 22 to the transparent reflective portion 12 changes from an angle of incidence of the light L1 into the transmitting portion 22. However, since the steps 30 are provided also on the back surface 12B of the transparent reflective portion 12, an angle of transmission of the light L1 from the transparent reflective portion 12 is the same as the angle of incidence of the light L1 from the outdoor view 8 into the transmission portion 22. Therefore, the transmission portion 22 prevents the angle of transmission of the light L1 transmitted from the transparent reflective portion 12 toward the viewer 4 from being changed from the original angle of incidence of the light L1.

By the way, a part of the light L1 incident from the transmission portion 22 is reflected by the back surface 12B of the transparent reflective portion 12 toward the reflective portion 14. Then, reflection of the light L1 is repeated between the reflective surface 14A of the reflective portion 14 and the back surface 12B of the transparent reflective portion 12.

This repetition of reflection of the light L1 generates multiple optical paths of the light L1 transmitted from the transparent reflective portion 12 toward the viewer 4, and the optical paths have a positional difference along the y-axis direction in light L1. Hereinafter, the positional difference is referred to as a vertical disparity. When the viewer 4 moves the viewer's eyes to the left or right, the image of the outdoor view 8 may move up and down due to the vertical disparity. When an amount of the vertical disparity becomes large, the viewer 4 becomes difficult to visually recognize the outdoor view 8.

Regarding this, the steps 30 are provided on the reflective surface 14A of the reflective portion 14 and the back surface 12B of the transparent reflective portion 12 such that both the reflective surface 14A and the back surface 12B have the sawtooth shape in cross section along the y-axis direction. The slope angle θ2 of the slope 32 of each of the steps 30 is smaller than the tilt angle θ1 at which the transparent reflective portion 12 and the reflective portion 14 are tilted relative to the vertical axis y.

Such configurations of the angles θ1 and θ2 can reduce an interval between the optical paths of the light L1 transmitted from the front surface 12A of the transparent reflective portion 12 via reflections between the back surface 12B of the transparent reflective portion 12 and the reflective surface 14A of the reflective portion 14. As a result, the vertical disparity can be reduced.

According to the optical device 10 of the present embodiment, the transparent reflective portion 12 and the reflective portion 14 have the sawtooth shape in cross section along the y-axis direction by providing the steps 30 on the back surface 12B of the transparent reflective portion 12 and the reflective surface 14A of the reflective portion 14. Therefore, the amount of vertical disparity can be reduced, and visibility of the outdoor view 8 can be improved.

Other Embodiments

Although the embodiments of the present disclosure have been described above, the present disclosure is not limited to the embodiments described above, and various modifications can be made to implement the present disclosure.

For example, in the above embodiments, the obstacle 2 is a front pillar of an automobile. However, an obstacle to which the optical device 10 of the present disclosure is attached may be any member that hinders the viewer 4 from seeing surroundings from a predetermined viewpoint.

Multiple functions of one component in the above embodiments may be realized by multiple components. A function of one component may be realized by multiple components. In addition, multiple functions of multiple components may be realized by one component, or a single function realized by multiple components may be realized by one component. A part of the configuration of the above embodiments may be omitted. Further, at least part of the configuration of the above-described embodiment may be added to or replaced with the configuration of another embodiment described above.

The invention claimed is:

1. An optical device for introducing light from an outdoor view in a blind spot area hidden by an obstacle, the optical device comprising:

a first reflector that reflects a part of light and transmits another part of the light, the first reflector having a front surface and a back surface on opposite sides of the first reflector;

a second reflector placed between the back surface of the first reflector and the obstacle and apart from the back surface of the first reflector by a predetermined distance, the second reflector having a reflective surface that reflects light incident from the first reflector toward the first reflector such that light coming from the outdoor view of the blind spot area to the first reflector is reflected by the back surface of the first reflector and then reflected by the reflective surface of the second reflector toward the first reflector; and a light shield placed such that the first reflector is between the second reflector and the light shield, the light shield being configured to block external light incident on and reflected from the front surface of the first reflector, wherein the light shield includes light-shielding plates arranged at an interval in a vertical direction such that a plate surface of each of the light-shielding plates is adapted so as to be horizontal in a view from a viewer who faces the front surface of the first reflector, and the first reflector has a plate shape parallel to the reflective surface of the second reflector and tilted at a predetermined tilt angle from a vertical axis that is vertical in the view from the viewer.

2. The optical device according to claim 1, further comprising a transmitter configured to transmit light and provided on an optical path of light that is incident on the first reflector from the outdoor view of the blind spot area, the transmitter having a plate shape tilted from the vertical axis at the same predetermined tilt angle as the first reflector, wherein the reflective surface of the second reflector and the back surface of the first reflector each have steps such that both the reflective surface and the back surface have a sawtooth shape in cross section along the vertical direction, the steps of the reflective surface of the second reflector and the steps of the back surface of the first reflector have the same shape, the steps of the reflective surface are inverted to the steps of the back surface in the vertical direction such that slopes of the sawtooth shape of the reflective surface are parallel to slopes of the sawtooth shape of the back surface, a slope angle of each of the slopes on both the reflective surface and the back surface is smaller than the predetermined tilt angle, and a surface of the transmitter facing the first reflector has steps such that the surface of the transmitter has the same sawtooth shape as the reflective surface of the second reflector.

3. The optical device according to claim 1, wherein
   the light-shielding plates of the light shield each protrude from the first reflector by a protruding length, and
   the protruding length and the interval of the light-shielding plates are configured to block light reflected from the back surface of the first reflector.

4. The optical device according to claim 1, wherein
   the light-shielding plates of the light shield are made of an absorbent material that absorbs the external light.

5. The optical device according to claim 1, wherein
the predetermined tilt angle at which the plate shape of the first reflector is tilted is a non-zero predetermined tilt angle from the vertical axis.

* * * * *